H. BARBER & D. C. & G. W. VAN BRUNT.
Seeding Machine.

No. 69,532.

Patented Oct. 8, 1867.

H. Barber & D. C. & G. W. Van Brunt.

Corn Planter.

Nº 69,532. Patented Oct. 8, 1867.

Sheet 2 – 2 Sheets.

Witnesses.
Frank Gilbert
I. Laun

Inventors.
Hiram Barber
Daniel C. Van Brunt
George W. Van Brunt
by Coburn & Mann
attorneys

United States Patent Office.

HIRAM BARBER, DANIEL C. VAN BRUNT, AND GEORGE W. VAN BRUNT, OF HORICON, WISCONSIN.

*Letters Patent No. 69,532, dated October 8, 1867.*

---

IMPROVEMENT IN SEEDING MACHINES.

---

*The Schedule referred to in these Letters Patent and making part of the same.*

---

TO ALL WHOM IT MAY CONCERN:

Be it known that we, HIRAM BARBER, DANIEL C. VAN BRUNT, and GEORGE W. VAN BRUNT, of Horicon, in the county of Dodge, and State of Wisconsin, have invented a new and useful Improvement in Seeding Machines; and we do hereby declare and make known that the following is a full, clear, and exact description of the same, reference being had to the accompanying drawings, and the letters and figures marked thereon, which form part of this specification.

Our said invention relates to that class of seeding machines which scatter the seed broadcast upon the ground. It consists in various specific devices and arrangements in different portions of the machine, as is hereinafter fully set forth and described.

To enable those skilled in the art to understand how to construct and use our invention, we will proceed to describe the same with particularity, making reference in so doing to the aforesaid drawings, in which—

Similar letters of reference in the several figures denote the same parts of our invention.

Those parts of the machine which are not embraced in our improvement are constructed in any of the known ways, and need no particular description, A representing the supporting frame, B the wheels, C the seed-hopper, and D the plough-beams.

Figure 3:
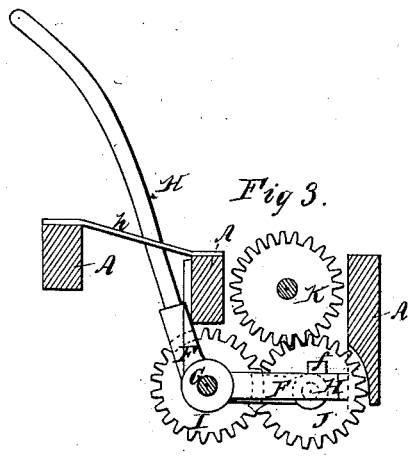
Figure 3 is a detached section, illustrating the mode of throwing the machine into and out of gear.

Each of the wheels is fixed upon an independent short axle revolving with it, said axles being supported in suitable boxes at the sides of the frame A at one end, and in suitable cast hangers F, secured to the frame beneath, as seen in fig. 3, the axle being indicated by G in said figure.

One feature of our invention consists in the arrangement shown in fig. 3 for throwing the seeding apparatus into and out of gear, in which G represents the axle, and I a pinion upon the said shaft, revolving with it.

H represents a bent lever, having at its angle a hole, through which the axle G passes, thus forming a fulcrum for said lever, upon the short arm of which a pinion, J, is supported in suitable bearings. The wheels I J are always in gear with each other, and revolve when the machine moves. By throwing the lever H back, the pinion J is thrown up into gear with the pinion K upon the shaft L, upon which the seeding-cylinders are arranged, in which case the apparatus for distributing the seed is in operation. When, however, the lever H is thrown forward, the pinion J moves down out from the pinion R, and the seeding apparatus stops.

There is arranged directly over the short arm of said lever H, either cast upon the hanger F or not, as may be preferred, a lug or stop, marked $f$, which prevents the teeth upon the pinion J from entering the teeth upon K too far when the lever H is thrown back, which otherwise might occur, and would have a tendency to break the cogs if thrown into gear when the machine is in motion; or, by the backing of the machine itself, the same result might occur. The lever H passes up through a slotted stay, $h$, provided with notches upon one side, into which the lever is held by a spring or otherwise to hold the same in place.

It will be observed that the gearing is all arranged beneath the machine at a distance from the wheels; and, as the wheels are fast upon the axle, the arrangement of the gearing in said position renders it impossible that the soil thrown up by the wheels should, in any manner, get into the bearings or gear of the machine.

Figure 1:
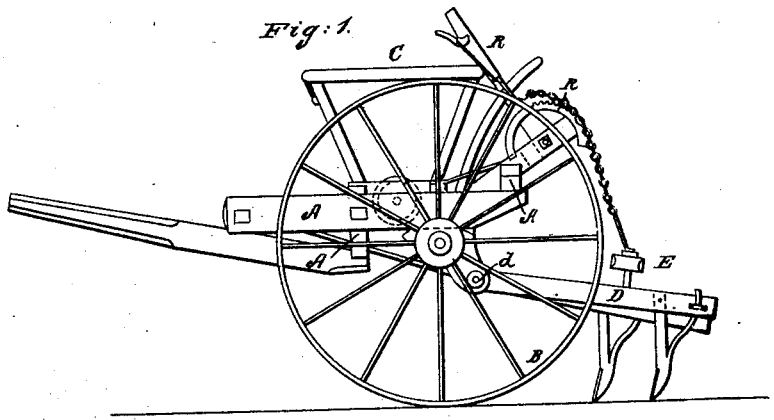
Figure 1 is a side elevation of our said invention.
Figure 2:
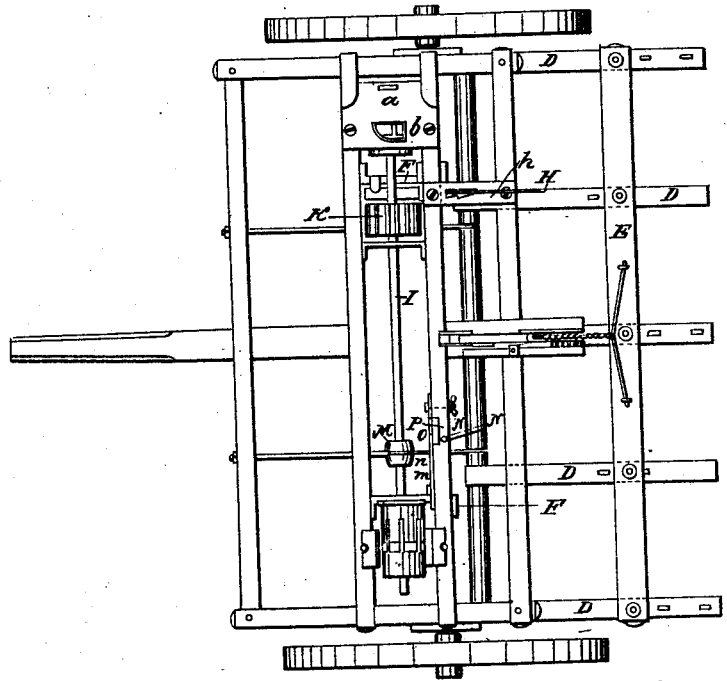
Figure 2 is a plan or top view, the seed-hopper being removed.

Upon the before-mentioned shaft are arranged any suitable number of seeding devices, only two of which, however, are represented in fig. 2, one with a plate or cover, $a$, upon the device, and one with said cover removed. The bottom of the seed-hopper is formed in a series of sloping or funnel-shaped compartments to insure the passage of the grain into the distributing-cells, entering through openings $b$ in the aforesaid plate $a$.

Figure 4:
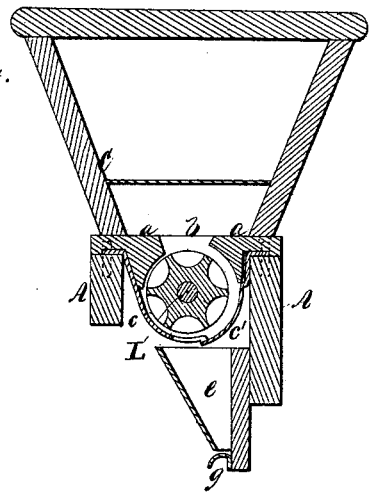
Figure 4 is a vertical section through one of the seeding devices.

The seed-cells are formed by two cylinders arranged upon the rod or shaft L in such a manner that moving one of said cylinders away from the other has the effect to increase the capacity of the cells, while moving them together decreases the capacity of said cells, thus regulating the amount of seed to be sown. These seed-cylinders rest upon a metallic band, curved as shown in fig. 4, marked $c$, the ends of which band are supported upon the frame, and are provided with an opening at the bottom, through which the seed is discharged into a tube, $e$, through which it falls upon a scattering device, marked $g$ in said fig. 4. The part of the band down which the seed is carried by the cells is depressed, as shown at $c'$, to allow the seed to discharge freely. The lower side of the covers $a$ are recessed, as shown, so as to fit closely down over the ends of the band $c$ upon the frame, and both cover and band are then fastened to the frame by the same screws, as shown in fig. 4. Upon one of the portions of each seed-cylinder there is a flange, which projects up into a slot in the cover $a$, so that, when a motion is imparted to the shaft L, as hereinafter described, one of said parts moves with the shaft, and the other part is held stationary; and thus the seed-cups are opened and closed by giving a longitudinal movement to said shaft L, the pinion K, before named, upon said shaft, being made of sufficient length to admit of this motion without throwing the machine out of gear.

Figure 5:
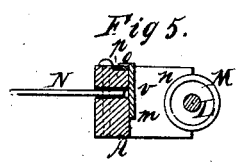
Figure 5 is a transverse vertical section through the arrangement for regulating the size of the seed-distributing cells.
Figure 6:
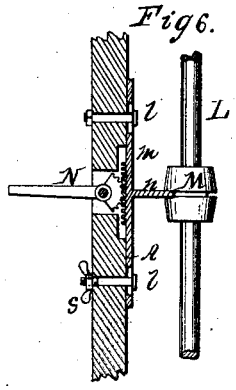
Figure 6 is a horizontal sectional view of the same.

The mode of effecting this result forms another feature of our invention, and this feature is shown in detail in figs. 5 and 6.

M represents an enlargement or drum upon the shaft L, with a notch or depression at its central line, extending entirely around the same, into which an arm or plate, $n$, enters, said arm $n$ being attached to a slide, $m$, secured upon the frame by means of bolts or screws passing through slots in said shield, allowing it to have a longitudinal movement, as hereinafter specified. Upon the inner face of said plate $m$ is a toothed rack, which engages in the toothed segment at the end of the lever N, as clearly shown in fig. 6. Upon one of the bolts securing the slides $m$ to the frame a set-screw, $s$, may be arranged to secure the slide in the desired position after adjustment.

From the above-described arrangement it will readily be seen that the movement of the lever N in one direction will give a corresponding movement to the shaft L, and so adjust the size of the seed-cups at pleasure.

Upon the top of the frame, as shown at $p$ in figs. 2 and 5, is a scale, marked off into spaces of suitable width; and upon the slide $m$ is a pointer, $o$, arranged so as to move along upon said scale, so that the operator may know, by observing the scale, how far to move the lever or slide to secure the desired width to the seed-cells.

Figure 7:
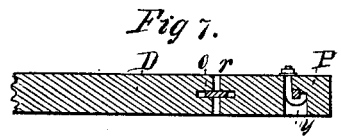
Figure 7 is a horizontal section through the rear end of the plough-beams, showing the mode of securing the ploughs or shovels thereto.
Figure 8:
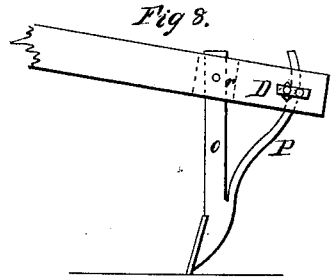
Figure 8 is a side view of the said-described arrangement.

Another feature of our invention is shown in figs. 7 and 8, and consists in a novel mode of securing the ploughs to the beams in such a manner as to allow a backward yielding motion upon meeting with obstacles, and thus prevent the breaking thereof.

O represents the main standard of the plough, passing up through a slot in the beam D, being secured therein by means of a bolt or pivot, $r$.

A branch-arm, P, its upper part constructed on a curve, having $r$ for its centre, passes up through a similar slot in the beam, where it is grasped by a hook or eye-bolt, $y$, passing through a transverse slot in the beam, so that, by turning a nut upon the exterior of the beam upon the said bolt $y$, the arm P is pressed against the beam, and secured in position with any desired force, holding firmly in moving through the ordinary soil, but sliding upwards upon meeting with any unusual obstruction.

Another feature of our invention consists in extending the segment K, which secures the lever R, by which the ploughs are raised up from the ground, in place down below the arm to which the same is attached, so that the operator can manage the machine in this respect either sitting upon the machine, or walking behind the same, as the aforesaid extension of the segment will allow the lever R to be arranged at nearly a horizontal position, so that it can readily be reached by a person behind the machine upon the ground.

Having described the construction and operation of the different features of our invention, we will specify what we claim, and desire to secure by Letters Patent:

1. We claim the arrangement of the gear-wheels I J K and lever F and stop $f$ beneath the machine and remote from the wheels, for the purposes specified, and substantially as described.

2. We claim the combination and arrangement of the axle G, gear-wheels I J K, lever F, and stop $f$, operating substantially as and for the purposes described.

3. We claim the arrangement of the stop $f$ with respect to the bent lever F and pinion J, substantially in the manner and for the purposes specified.

4. We claim the arrangement of the slide $m$, provided with the arm $n$, with the toothed lever N, as and for the purposes described.

5. We claim, in combination with the last foregoing, the arrangement of the scale $o$ and pointer $p$, for the purposes set forth.

6. We claim the peculiar construction of the segment K, and its arrangement with the lever R, for raising the ploughs, as and for the purposes herein described.

HIRAM BARBER,
DANIEL C. VAN BRUNT,
GEORGE W. VAN BRUNT.

Witnesses.
A. L. MOODY,
W. W. BUTTERFIELD.